United States Patent
Kelsch et al.

(10) Patent No.: US 12,139,648 B2
(45) Date of Patent: Nov. 12, 2024

(54) LATENTLY REACTIVE POLYURETHANE-BASED ADHESIVE FILM

(71) Applicant: LOHMANN GMBH & CO. KG, Neuwied (DE)

(72) Inventors: Annette Kelsch, Melsbach (DE); Jana Ast, Andernach (DE); Kerstin Schindler, Rederscheid (DE)

(73) Assignee: LOHMANN GMBH & CO. KG, Neuwied (DE)

( * ) Notice: Subject to any disclaimer, the term of this patent is extended or adjusted under 35 U.S.C. 154(b) by 584 days.

(21) Appl. No.: 17/298,296

(22) PCT Filed: Nov. 29, 2018

(86) PCT No.: PCT/EP2018/083069
§ 371 (c)(1),
(2) Date: May 28, 2021

(87) PCT Pub. No.: WO2020/108765
PCT Pub. Date: Jun. 4, 2020

(65) Prior Publication Data
US 2022/0025229 A1      Jan. 27, 2022

(51) Int. Cl.
| | |
|---|---|
| C09J 7/35 | (2018.01) |
| C08G 18/75 | (2006.01) |
| C08G 18/76 | (2006.01) |
| C08K 3/08 | (2006.01) |
| C08K 3/40 | (2006.01) |
| C08K 9/02 | (2006.01) |
| C09J 9/02 | (2006.01) |
| C09J 175/04 | (2006.01) |

(52) U.S. Cl.
CPC .......... *C09J 175/04* (2013.01); *C08G 18/755* (2013.01); *C08G 18/7621* (2013.01); *C08K 3/08* (2013.01); *C08K 3/40* (2013.01); *C08K 9/02* (2013.01); *C09J 7/35* (2018.01); *C09J 9/02* (2013.01); *C08K 2003/0812* (2013.01); *C08K 2003/085* (2013.01); *C08K 2201/001* (2013.01); *C09J 2301/304* (2020.08); *C09J 2301/314* (2020.08); *C09J 2301/408* (2020.08); *C09J 2475/00* (2013.01)

(58) Field of Classification Search
CPC .......... C08J 2375/00; C08J 3/24; C08J 3/242
See application file for complete search history.

(56) References Cited

U.S. PATENT DOCUMENTS

| | | |
|---|---|---|
| 6,506,280 B2 | 1/2003 | Ganster et al. |
| 9,550,929 B2 | 1/2017 | Schmitz-Stapela et al. |
| 10,202,524 B2 | 2/2019 | Yamada et al. |
| 2003/0119976 A1 | 6/2003 | Ganster et al. |
| 2009/0123757 A1 | 5/2009 | Pudleiner et al. |
| 2015/0017452 A1* | 1/2015 | Schmitz-Stapela ........ C09J 5/00 156/289 |
| 2016/0046775 A1 | 2/2016 | Mai et al. |
| 2017/0210947 A1* | 7/2017 | Yamada ................ C09J 11/04 |
| 2017/0305132 A1 | 10/2017 | Dollase et al. |
| 2020/0032110 A1 | 1/2020 | Busch et al. |

FOREIGN PATENT DOCUMENTS

| | | |
|---|---|---|
| DE | 10 2012 203249 A1 | 9/2013 |
| DE | 10 2013 217880 A1 | 3/2015 |
| EP | 1134245 A2 | 9/2001 |
| EP | 2884590 A1 | 6/2015 |
| EP | 3118934 A1 | 1/2017 |
| JP | S61-40149 | 2/1986 |
| JP | H9-228079 | 9/1997 |
| JP | 2014060025 A | 4/2014 |
| JP | 2015170581 A | 9/2015 |
| JP | 2018-022827 | 2/2018 |
| JP | 2018503701 A | 2/2018 |
| KR | 10-2010-0087713 | 8/2010 |
| KR | 10-2016-0132911 | 11/2016 |
| RU | 2010123438 A | 12/2011 |
| WO | 2003016374 A1 | 2/2003 |
| WO | WO-2009048674 A2 * | 4/2009 ............... C08J 5/24 |
| WO | 2018002312 A1 | 1/2018 |

OTHER PUBLICATIONS

First Office Action for corresponding Indian patent application No. 202127026843, 5 pages, dated Nov. 29, 2022.
First Office Action for corresponding Korean patent application No. 10-2021-7020270, 14 pages, dated Apr. 24, 2023.
Second Office Action for corresponding Japanese application No. 2021-531257, 8 pages, dated May 2, 2023.
First Office Action and Search Report for corresponding Japanese application No. 2021-531257, 7 pages, dated Aug. 23, 2022.
International Search Report for corresponding international application PCT/EP2018/083069, 8 pages, dated Jul. 25, 2019.
Written Opinion for corresponding international application PCT/EP2018/083069, 9 pages, dated Jul. 25, 2019.
1 First Office Action for corresponding Chinese application No. 201880099792.9, 17 pages, dated Oct. 26, 2022.
First Office Action for corresponding European patent application No. 18815576.6, 10 pages, dated Jun. 13, 2023.
Nurazzi et al."Introduction to Polymer Crystallization: Methods, Characterizations and Applications" Polymer Crystallization: Methods, Characterization and Applications, Oct. 30, 2023, Wiley.

* cited by examiner

*Primary Examiner* — Mark S Kaucher

(74) *Attorney, Agent, or Firm* — Ruggiero McAllister & McMahon LLC

(57) ABSTRACT

The present disclosure relates to a latently reactive conductive polyurethane-based adhesive film.

18 Claims, No Drawings

LATENTLY REACTIVE POLYURETHANE-BASED ADHESIVE FILM

CROSS REFERENCE TO RELATED APPLICATIONS

The present application is a national stage U.S. patent application of International Patent Application PCT/EP2018/083069, filed on Nov. 29, 2018.

TECHNICAL FIELD

The present disclosure relates to a latently reactive conductive polyurethane-based adhesive film.

DISCUSSION OF RELATED ART

The demands regarding adhesive bonds are constantly increasing so that the forces that pressure-adhesive tapes are able to tolerate frequently are no longer sufficient. Also the range of application for adhesive bonds is continually growing.

Heat-activatable, reactive polyurethane-based adhesive films are one way to meet this growing demand. Due to the high polarity of the polymer molecules and the partially crystalline structure within the polymer chains, polyurethane adhesives are characterised by very good adhesive properties, also on surfaces that are difficult to bond. Moreover, polyurethane adhesives exhibit high resilience vis-à-vis plasticisers such as oils, fats, humidity, heat and in part also solvents.

Using polyurethane adhesives, it is possible to provide single-component systems that can be used right away, i.e. no mixing of the components immediately prior to their application is required and no pot life needs to be taken into account in regard of final curing.

Regardless thereof, the adhesive force of the single-component, latently reactive systems still is essentially on par with the adhesive force of two-component systems. Accordingly, single-component, latently reactive adhesive systems are capable of achieving quasi-static shear strength values on polycarbonate (PC) of >12 MPa.

In this context, "latently reactive" means that an aqueous polyurethane dispersion layer that may for example be as thin as 100 µm can be applied quite some time prior to the actual bonding process onto a join partner and dried. At room temperature, this layer remains storage-stable and block-free, and the adhesive is only activated later on when heated, thus effecting the bonding of the two join partners. Therefore, the user can separate the application of the adhesive and the final creation of the adhesive bond not only from a temporal but also from a spatial point of view.

In the quasi-static test method, the load is applied slowly, shock-free and with increasing intensity until the sample under test breaks, in the case in hand, this test is used to determine shear strength measured in MPa (megapascal). Shear strength is the resistance of a solid body vis-à-vis tangential shear forces.

Latently reactive, heat-activatable adhesive systems are known, e.g. from DE 10 2010 013 145 A1 and DE 10 2011 008 430 A1.

The adhesive compound illustrated in DE 10 2010 013 145 A1 satisfies a combination of different requirement profiles that to date have not been catered for jointly by a single adhesive system, namely first of all a latently reactive adhesive that is slightly tacky already at room temperature that cures subject to heat application and that allows for structural adhesive bonding of both join partners. "Structural adhesive bonding" means that the two join partners are joined together to form a single structure by the adhesive, characterised in that in the case of an attempted subsequent separation of the two join partners one of the two join partners constitutes the weak point of the structure rather than the adhesive seam.

DE 10 2011 008 430 A1 shows a "dry" heat-activatable, latently reactive, single-component polyurethane film that exhibits zero adhesive force at room temperature and also is no longer tacky after activation by heat application and subsequent cooling down but constitutes a component of a structural bond between two join partners, as described above. One advantage of the system described in both applications is the option to provide substrate surfaces with a reactive adhesive layer in a storage-stable manner, i.e. the adhesive application step can be removed from the actual manufacturing process of the desired end product. This way, processes are simplified and thus also more cost-efficient.

Moreover, it has been a trend in the industry to provide adhesives with additional properties. Adhesives are known, e.g. that apart from adhesive force also exhibit conductive properties.

Conductive adhesives are known in the art, also conductive adhesive compounds that include urethane or that are based on urethane. WO 2014/122866 A1, e.g. describes a heat-conductive, light-curable adhesive compound comprising polyurethane and a photo-polymerisable monomer with a (meth)acryloyl group as well as an inorganic filler and a photo-initiator.

WO 2009/090997 A1 discloses a curable electromagnetic shielding adhesive structure consisting in a layer including electroconductive fillers based on polyurethane polyurea and epoxy resin as well as a curable insulating layer based on a second polyurethane polyurea compound and epoxy resin without fillers.

WO 2016/002780 A1 relates to a conductive adhesive composition comprising a polyurethane polyurea, an epoxy resin and a filler, whereas the polyurethane polyurea is a reaction product of a polyamino compound and a urethane prepolymer. The latter in turn is a reaction product of a polyol component, a diisocyanate and a diol compound. The finished film is liquefied by heat application and then flows between the parts to be joined.

The adhesive film according to WO 2006/088127 A1 has an electromagnetic shielding effect due to the electroconductive fillers included in its curable adhesive layer based on polyurethane polyurea and epoxy resin.

WO 2018/003704 A1 discloses an electroconductive adhesive that cross-links under heat application, comprising a specific urethane-modified poly-functional (meth)acrylate oligomer, a mono-functional (meth)acrylate monomer, an organic peroxide as well as electroconductive particles.

None of the conductive adhesives described above, however, is capable of providing high quasi-static shear strength in the order of magnitude e.g. of >6 MPa, thus allowing for a structural bond. Correspondingly, the above conductive adhesive systems are only suitable for a comparably limited scope of application. These adhesives are not available for scopes of application requiring relatively high, i.e. structural adhesive bond strength such as, e.g. high quasi-static shear strength.

Accordingly, there is need for adhesives exhibiting not only high quasi-static shear strength but also conductive properties. Corresponding desirable fields of application are, e.g., spatial adhesive bonds with inherent capability of electric dissipation for carpeting adhesive bonds or contacts for heating textiles such as a seat heating or heatable wall elements. Also in the fashion industry, interest is growing in integrating conductive elements. All these fields of application are associated with relatively high requirements in terms of adhesive bond strength. Using the means known in the art, the requirements of providing adhesive bond strength as well as conductivity at the same time can only be met separately.

DESCRIPTION OF THE DISCLOSURE

Described is a latently reactive polyurethane-based adhesive film with an enhanced range of application, a use of the adhesive film as well as a corresponding manufacturing method.

A latently reactive polyurethane-based adhesive film is described that comprises up to 98 percent by weight of a crystalline and/or a crystalline and amorphous polyurethane component, and 2 to 80 percent by weight, for example, 2 to 65 percent by weight, of a conductive filler.

The crystalline polyurethane component forms a dry film having a semi-crystalline structure, which has the effect that the film is not tacky at room temperature and can thus be repositioned easily.

In contrast thereto, a crystalline and amorphous polyurethane component has a mild tack at room temperature, i.e. a mild tackiness.

The polyurethane-based films melt at a temperature of 50° C. plus/minus 10° C. When the films are melted at a temperature in the melting temperature range, they exhibit tacky properties allowing for pre-lamination, i.e. a first alignment of the join partners with respect to one another.

The actual activation of the films is effected at temperatures in the range of 70-120° C. Following completion of the reaction triggered by heat activation, a final strength structural bond is obtained that is capable of permanently withstanding relatively high stress impact.

By adding conductive fillers, the range of application of the latently reactive adhesive films can be increased substantially. A crystalline polyurethane component with conductive filler particles dispersed into it has a high strength already after cooling down to room temperature. This is due to the re-crystallisation of the polyurethane components alone.

The fillers can be electroconductive, thermally conductive or magnetically conductive. Integrating these fillers in a crystalline and/or a crystalline-amorphous polyurethane component provides for an adhesive system with a comparably high quasi-static shear strength on polycarbonate of >6 MPa and more. This way, spatial, conductive structural bonds can be provided.

Carpeting bonding is a sample use case, where the bond is typically subjected to high strain. In this context, adhesives with high adhesion strength are required. With the adhesive system described above, carpeting adhesive bonds can be provided that are not only high-strength but also capable of electric dissipation.

Adhesive bonds are widely used in the textile industry. There is a trend to integrate electronic components in textiles, such as apparel. Conductive tracks may for example be provided in the form of strip liners or stamped parts for light integration in the fashion sector. Given that apparel is typically subjected to high strain during wear, the conductive adhesive systems have a corresponding high bond strength. The adhesive system described above is fit to meet these requirements.

The conductive material can be provided in different particle forms. Therefore, spherical, dendritic, rod-shaped, spattered (unshaped) or also platelet-shaped particles can be used.

If conductivity is desired in the z direction of the adhesive film, which is usually the case in thick adhesive layers, it is advantageous to rather use larger volume particles, because fewer gaps have to be bridged this way. This is, however, associated with the disadvantage that the particles will settle faster in the container after manufacture of the conductive adhesive compound so that no stable conductive dispersion is created, which has a significant negative impact on processability. In order to prevent this, dispersing additives are added to adhesives containing these particles, which in turn also results in decreased conductivity, though. For thin adhesive layers, however, conductivity in the x-y direction of the adhesive film is advantageous. In this context, the use of flat, platelet-shaped particles is favourable, which align parallel to the adhesive surface.

However, it must be taken into account that the larger the particle surface, the fewer particles can be included in the adhesive system.

In a further development, the polyurethane component is capable of reacting with isocyanate. The crystalline polyurethane component can, e.g., be based on an anionic high-molecular polyurethane dispersion. It will form a dry film exhibiting a semi-crystalline structure, which has the effect that the film is not tacky at room temperature and can thus be repositioned easily.

In another embodiment, the crystalline polyurethane component comprises semi-crystalline polyester polyurethane. This allows for melting the crystalline domains so that tacky properties develop, allowing for pre-lamination.

In a further development, the adhesive film comprises a cross-linking agent, such as e.g. an isocyanate-containing component particularly dispersed into the polyurethane component.

The crystalline polyurethane component with isocyanate particles dispersed into it forms a dry film exhibiting a semi-crystalline structure, which has the effect that the film is not tacky at room temperature and can thus be repositioned easily.

The actual activation of the adhesive film is effected in a temperature range of 50-120° C. By adding a cross-linking agent such as, e.g. isocyanate, an additional cross-linking reaction is triggered by heat treatment activation. In this, the isocyanate groups react with the functional groups of the thermoplastic polyurethane and cross-link the system, increasing the strength of the film. Consequently, the adhesive film exhibits the relatively high strength values of up to 10 MPa also subject to higher temperatures. Following completion of the reaction triggered by heat activation, a structural bond of final strength is obtained that is capable of permanently withstanding relatively high stress forces.

In the case of blocked isocyanate groups, the activation temperature depends on the de-blocking temperature. In the case of isocyanate groups deactivated in the area of the surface of the isocyanate particles, activation starts with the melting of the isocyanate particles.

By combining polyurethane components with isocyanate-containing components, bonds with particularly high final strength are achieved after heat activation that withstand permanent high strain.

In yet another embodiment, the latently reactive adhesive film comprises up to 40 percent by weight of a cross-linking agent, up to 5 percent by weight of a thickening agent and/or up to 5 percent by weight of a dispersing additive.

As described above, the cross-linking agent effects a curing of the adhesive following activation by respective temperatures. The thickening agent provides the adhesive dispersion with the viscosity required for coating during production. During production of the adhesive, the dispersing additive helps ensure that the different components are distributed homogeneously.

In a further development, the amorphous polyurethane component comprises polyurethanes and/or polyacrylates. In the latter case, this applies because the adhesive properties of acrylates facilitate their adhesion to substrates that polyurethane will adhere to less readily.

In a further development, the latently reactive conductive adhesive film has a quasi-static shear strength of at least 6 MPa on PC. This provides for conductive adhesive films with unprecedented strength properties. Depending on the choice of fillers, shear strength may also achieve values in excess of 8 MPa on PC.

In yet another embodiment, the conductive filler comprises metals, silver-enhanced metals, metal oxides, metal hydroxides, metal nitrides, carbon-containing materials, conductive polymers, magnetically soft materials and/or magnetically hard materials.

Electroconductive fillers include metals such as, e.g. silver, silver-enhanced metals and metal oxides such as, e.g. silver-enhanced copper, silver-enhanced aluminium, silver-enhanced glass or silver-enhanced zinc oxide; carbon-containing materials such as, e.g. graphite, graphene, carbon nano tubes (CNT) and conductive polymers such as, e.g. poly-3-hexylthiophene (P3HT).

Thermally conductive fillers include metal oxides such as, e.g. aluminium oxide, metal hydroxides such as, e.g. aluminium hydroxides and metal nitrides such as, e.g. boron nitride.

Magnetically conductive fillers include magnetically soft materials such as, e.g. alloys based on cobalt, nickel or iron; and magnetically hard materials such as, e.g. neodymium-iron-boron (NdFeB) or cobalt-samarium.

The particle size of metal-based fillers is between 2 nm and 30 μm. The particle size of fillers in the form of silver-enhanced materials is between 2 μm to 100 μm, preferably between 18 μm to 75 μm. The particle size of fillers in the form of carbon-containing materials is usually between 3 nm to 70 μm.

The filler contained in the adhesive film in hand may also be based on particle mixtures comprising the fillers described above. Preferably, mixtures of silver-enhanced materials and carbon-containing materials are used. Using the above combination of fillers, adhesive films with high quasi-static shear strength values can be provided that simultaneously offer high electroconductivity.

At room temperature, the adhesive film exhibits little to no tack and can thus be easily positioned or repositioned at the application site or on the corresponding join partners.

In an embodiment, the latently reactive polyurethane-based adhesive film has a layer thickness of 7 μm to 1000 μm.

The object specified above is further achieved by the use of a latently reactive polyurethane-based adhesive film having the features of claim 6. Accordingly, the adhesive film is applied to the application site or the join partners, where the adhesive film ultimately reaches its final bond strength subject to an activation temperature of 70-120° C.

The actual activation of such an adhesive film is effected at temperatures in the range of 50-120° C. There, the isocyanate groups react with the functional groups of the thermoplastic polyurethane and thus contribute to cross-linking the system, increasing the strength of the film. Following completion of the reaction triggered by heat activation, a structural bond of final strength is obtained that is capable of permanently withstanding relatively strong stress forces.

The object specified above is further achieved by a method of manufacturing a latently reactive polyurethane-based adhesive film having the features of claim 7. Accordingly, first up to 98 percent by weight of a crystalline and/or a crystalline and amorphous polyurethane dispersion are mixed with 2 to 80 percent by weight, preferably 2 to 65 percent by weight, of a conductive filler. Subsequently, the polyurethane dispersion including the conductive filler dispersed into it is applied onto a backing, in particular a conductive backing or a release liner so that a compound is created. Finally, the compound is dried.

The advantages of a latently reactive polyurethane-based adhesive film with conductive fillers dispersed into it derive from the above description.

DETAILED DESCRIPTION OF EMBODIMENTS

What follows is a description of test examples.

In an embodiment, a latently reactive polyurethane-based adhesive film can be provided using the following basic materials. A polyurethane dispersion may include an aromatic cross-linking agent such as, e.g. toluylene-diisocyanate compounds (TDI compounds) and/or an aliphatic cross-linking agent such as, e.g. isophorone diisocyanate (IPDI). The following particles can, e.g. be used as electroconductive fillers: eConduct Aluminium 202000®, eConduct Aluminium 451500®, VP70308®, eConduct Glass 352000®, eConduct Glass 205002® and eConduct Copper 341000® all by the company ECKART GmbH. The average customary particle size in the tests performed has a diameter of 50 μm.

A general formulation of a polyurethane-based latently reactive conductive adhesive film may be provided as follows:

TABLE 1

| Components | Proportion |
| --- | --- |
| Crystalline PU component | up to 98 percent by weight |
| Crystalline + amorphous PU component | up to 98 percent by weight |
| Conductive fillers | 2 up to 80 percent by weight |
| Cross-linking agent | 0 up to 40 percent by weight |
| Thickening agent | 0 up to 5 percent by weight |
| Dispersing additive | 0 up to 5 percent by weight |
| Other additives | 0 up to 5 percent by weight |

It derives from table 1 that the crystalline polyurethane component and the conductive fillers form the main components of the conductive, latently reactive adhesive film. A crystalline polyurethane component with conductive filler particles dispersed into it has high strength already after cooling down to room temperature. This is due to the re-crystallisation of the polyurethane components alone.

By adding a cross-linking agent such as, e.g. isocyanate, an additional cross-linking reaction is triggered by activation by heat treatment. There, the isocyanate groups react with the functional groups of the thermoplastic polyurethane and cross-link the system. Therefore, the adhesive film exhibits the relatively high strength values in excess of 6 MPa on PC also at higher ambient temperatures.

Finally, the following additives can be included as well: De-foaming agents, stabilisers, dyeing pigments, catalysts, antioxidants, light protection agents and further polymers for adjusting other adhesive properties.

For testing purposes, two latently reactive polyurethane-based adhesive films were manufactured. The two test adhesive films are referred to as System 1 and System 2 hereinafter. The following formulations correspond to the liquid polyurethane dispersion.

System 1

TABLE 2

| Components | Proportion |
| --- | --- |
| Crystalline PU component | 54.1 percent by weight |
| Cross-linking agent (isocyanate) | 11.1 percent by weight |
| Conductive filler (eConduct Aluminium 451500 ®) | 32.6 percent by weight |
| Thickening agent | 1.4 percent by weight |

When measuring conductivity in the z direction, i.e. perpendicular to the spatial adhesive layer, System 1 exhibits comparatively high conductivity in the range of 0.2-0.4 mOhm.

System 2

TABLE 3

| Components | Proportion |
| --- | --- |
| Crystalline PU component | 66.4 percent by weight |
| Cross-linking agent (isocyanate) | 13.6 percent by weight |
| Conductive filler (eConduct Copper 341000 ®) | 17.3 percent by weight |
| Thickening agent | 1.4 percent by weight |

When measuring conductivity in the z direction, i.e. perpendicular to the spatial adhesive layer, System 2 exhibits comparatively lower conductivity on copper substrates with resistance values in the range of 2-30 mOhm. This is due to the fact that the conductive filler used is platelet-shaped (eConduct Copper 341000®).

Manufacturing

Described hereinafter is the manufacture of a conductive, latently reactive adhesive film.

Liquid crystalline polyurethane is optionally homogenised with a cross-linking agent and the corresponding conductive particles in a speed mixer. The resulting dispersion is applied onto a substrate using a blade. The resulting film is dried at 50° C. for 5 minutes. Finally, a conductive, latently reactive adhesive film with a layer thickness of 100 μm is obtained.

The coating process can be repeated on the second side of the substrate, resulting in a two-sided latently reactive adhesive tape.

Test Set-Up

The tests as described hereinafter were carried out to determine quasi-static shear strength and electroconductivity depending on the adhesive film systems.

First, two copper sheets are cut, abraded and cleaned. The copper sheets are arranged in an overlapping position, with the overlapping surface amounting to 312.5 mm$^2$ and wherein the adhesive tape described above is inserted between the two copper sheets. Finally, the two copper sheets and the adhesive tape are pressed together. This is carried out subject to 2.5 bar at 120° C. for 5 minutes. This is followed by a cold pressing step at 3.5 bar for 3 minutes.

In a next step the two exposed ends of the copper platelets are connected to an ohmmeter. The ohmmeter used is a Loresta-RX low impedance ohmmeter by the company NH-Instruments.

Apart from measuring the electrical resistance, a quasi-static shear strength test is carried out based on a surface of 312.5 mm$^2$ on PC.

The tests showed the following results:

TABLE 4

| Filler | Filler content in the dry adhesive film | Quasi-static shear strength on PC | Electroconductivity |
| --- | --- | --- | --- |
| Silver-enhanced aluminium (spherical) System 1 | 52 percent by weight | 9.1 MPa (2827 N/312.5 mm$^2$) | 0.19-0.4 mOhm |
| Silver-enhanced glass (platelets) | 42 percent by weight | 6.4 MPa (2000 N/312.5 mm$^2$) | 2.6-5.7 mOhm |
| Silver-enhanced copper (platelets) System 2 | 32 percent by weight | 8.3 MPa (2588 N/312.5 mm$^2$) | 2,057-31,400 mOhm |

The tests showed that the quasi-static shear strength of the adhesive films is in excess of 6 MPa on PC regardless of the choice of conductive filler.

Systems with fillers based on silver-enhanced metals such as, e.g. silver-enhanced aluminium and silver-enhanced copper achieve shear strength values between 8 to 11 MPa on PC also at comparatively high filler levels (i.e. even with more than 50% fillers depending on the filler used).

For completeness' sake it should be noted that latent reactive adhesive films without fillers can achieve quasi-static shear strength values of greater than 12 MPa.

The invention claimed is:

1. A latently reactive polyurethane-based adhesive film, comprising:
   up to 98 percent by weight of a polyurethane component, the polyurethane component being a crystalline polyurethane component or a crystalline and amorphous polyurethane component, or both,
   2 to 80 percent by weight of a conductive filler; and
   a cross-linking agent comprising an isocyanate-containing component dispersed into the polyurethane component
   wherein the latently reactive conductive adhesive film has a quasi-static shear strength of at least 6 MPa on a polycarbonate.

2. The latently reactive polyurethane-based adhesive film of claim 1, wherein the adhesive film further comprises:
   up to 40 percent by weight of a cross-linking agent,
   up to 5 percent by weight of a thickening agent, and/or
   up to 5 percent by weight of a dispersing additive.

3. The latently reactive polyurethane-based adhesive film of claim 1, wherein the conductive filler comprises conductive materials, the conductive materials being selected from the group consisting essentially of: metals, silver-enhanced metals, metal oxides, metal hydroxides, metal nitrides, carbon-containing materials, conductive polymers, magnetically soft materials, and magnetically hard materials.

4. A method comprising: applying the latently reactive polyurethane-based adhesive film of claim 1 on an application site or a set of respective join partners, where the adhesive film reaches its final bond strength at an activation temperature of 70-120° C.

5. A method of manufacturing a latently reactive the polyurethane-based adhesive film of claim 1, comprising:
   mixing up to 98 percent by weight of a crystalline or a crystalline and amorphous polyurethane dispersion, or an admixture of both, with 2 to 80 percent by weight of a conductive filler;
   applying the polyurethane dispersion including the conductive filler dispersed into it onto a backing to create a compound, and
   drying the compound.

6. The latently reactive polyurethane-based adhesive film of claim 1, further comprising: 2 to 65 percent by weight of the conductive filler.

7. The latently reactive polyurethane-based adhesive film of claim 6, wherein the polyurethane dispersion including the conductive filler dispersed into it further comprises:
   up to 40 percent by weight of the cross-linking agent,
   up to 5 percent by weight of a thickening agent, and/or
   up to 5 percent by weight of a dispersing additive.

8. The method of claim 5 wherein the polyurethane dispersion including the conductive filler dispersed into it further comprises: 2 to 65 percent by weight of the conductive filler.

9. The method of claim 5 wherein the backing comprises: a conductive backing.

10. The method of claim 5 wherein the backing comprises: a release liner.

11. The method of claim 5, wherein the polyurethane dispersion including the conductive filler dispersed into it further comprises the cross-linking agent.

12. The method of claim 5, wherein the polyurethane dispersion including the conductive filler dispersed into it further comprises:
   up to 40 percent by weight of the cross-linking agent,
   up to 5 percent by weight of a thickening agent, and/or
   up to 5 percent by weight of a dispersing additive.

13. The method of claim 5, wherein the polyurethane dispersion including the conductive filler comprises conductive materials, the conductive materials being selected from the group consisting essentially of: metals, silver-enhanced metals, metal oxides, metal hydroxides, metal nitrides, carbon-containing materials, conductive polymers, magnetically soft materials, and magnetically hard materials.

14. The latently reactive polyurethane-based adhesive film of claim 6, wherein the polyurethane dispersion including the conductive filler dispersed into it further comprises the cross-linking agent.

15. The latently reactive polyurethane-based adhesive film of claim 7, wherein the conductive filler comprises conductive materials, the conductive materials being selected from the group consisting essentially of: metals, silver-enhanced metals, metal oxides, metal hydroxides, metal nitrides, carbon-containing materials, conductive polymers, magnetically soft materials, and magnetically hard materials.

16. The method of claim 4, wherein the adhesive film further comprises:
   up to 40 percent by weight of a cross-linking agent,
   up to 5 percent by weight of a thickening agent, and/or
   up to 5 percent by weight of a dispersing additive.

17. The method of claim 4, wherein the conductive filler comprises conductive materials, the conductive materials being selected from the group consisting essentially of: metals, silver-enhanced metals, metal oxides, metal hydroxides, metal nitrides, carbon-containing materials, conductive polymers, magnetically soft materials, and magnetically hard materials.

18. The method of claim 4 wherein the adhesive film further comprises: 2 to 65 percent by weight of the conductive filler.

* * * * *